United States Patent
Cao et al.

(10) Patent No.: US 7,277,707 B2
(45) Date of Patent: Oct. 2, 2007

(54) RADIO TELECOMMUNICATIONS NETWORK, AND A METHOD OF SELECTING BASE STATION ANTENNAS FOR CONNECTION WITH A MOBILE USER TERMINAL

(75) Inventors: Qiang Cao, Swindon (GB); Patrick Georges Venceslas Charriere, Tetbury (GB); Seau Sian Lim, Swindon (GB); Philip Charles Sapiano, Corsham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 567 days.

(21) Appl. No.: 10/809,881

(22) Filed: Mar. 25, 2004

(65) Prior Publication Data

US 2005/0215201 A1    Sep. 29, 2005

(51) Int. Cl.
*H04Q 7/20*     (2006.01)

(52) U.S. Cl. .................. 455/436; 455/437; 455/438; 455/439; 455/442; 455/67.11; 455/67.14; 455/115.1; 370/328; 370/332; 370/338; 370/412

(58) Field of Classification Search .............. 455/436, 455/437, 438, 442, 439, 67.11, 67.14, 115.1; 370/328, 332, 338, 412
See application file for complete search history.

(56) References Cited

U.S. PATENT DOCUMENTS

| | | | |
|---|---|---|---|
| 5,864,760 A | 1/1999 | Gilhousen et al. | 455/442 |
| 6,594,243 B1 * | 7/2003 | Huang et al. | 370/332 |
| 6,754,493 B1 * | 6/2004 | Jetzek | 455/436 |
| 2004/0142692 A1 * | 7/2004 | Schwarz et al. | 455/442 |
| 2006/0159051 A1 * | 7/2006 | English | 370/332 |

FOREIGN PATENT DOCUMENTS

| | | |
|---|---|---|
| WO | WO99/43177 | 8/1999 |
| WO | WO 00/38456 | 6/2000 |

OTHER PUBLICATIONS

European Search Report for Appl. No. 05251544.2-2412-, (Jul. 4, 2005).

* cited by examiner

*Primary Examiner*—Joseph Feild
*Assistant Examiner*—Khai Nguyen

(57) ABSTRACT

In the method provided, test transmissions between the mobile user terminal and base station antennas are made, and the received test transmissions processed to determine respective signal path quality for each of the base station antennas. Upon the determined signal path quality exceeding a first predetermined threshold, but being less than a second predetermined threshold higher than the first predetermined threshold, the mobile user terminal is connected to the corresponding base station antenna by control channels but not data channels so as to be time synchronised. Upon the determined signal path quality exceeding the second predetermined threshold, the mobile user terminal is connected to the corresponding base station antenna by both control channels and data channels so as to be call connected.

10 Claims, 3 Drawing Sheets

RADIO TELECOMMUNICATIONS NETWORK, AND A METHOD OF SELECTING BASE STATION ANTENNAS FOR CONNECTION WITH A MOBILE USER TERMINAL

FIELD OF THE INVENTION

The present invention relates to a radio telecommunications network, and a method of selecting base station antennas for connection with a mobile user terminal in a radio telecommunications network.

DESCRIPTION OF THE RELATED ART

In wireless telecommunications networks of code division multiple access (CDMA) type, soft handover is commonplace. Soft handover is also known as soft handoff. Soft handover is where a mobile user terminal has radio connections with the network via a number of different cells at the same time, for example to multiple antennas of a base station or to multiple base stations. The aim of soft handover is to maintain a call despite radio fading. One type of CDMA network is a Universal Mobile Telecommunications System (UMTS) network.

The cells currently connected to by radio connections with the mobile user terminal are known as the active set. The mobile user terminal communicates using these cells. The mobile user terminal is also instructed by the network to also monitor signal quality to/from some neighbouring cells, which are not in the active set. This is in order to determine whether establishing a radio connection to any of these neighbouring cells would be helpful in maintaining the quality of the call. Signal quality is evaluated, for example, as signal strength. The set of neighbouring cells currently being investigated in this way is known as the monitored set.

Furthermore, the mobile user terminal sometimes detects signals from other cells which are neither in the active set nor monitored set. These other cells are known as the detected set. The collective term for the cells of the monitored set and cells of the detected set, if any, is the monitored/detected set.

As is well known in soft handover, when the signal quality of a cell from the monitored/detected set exceeds a predetermined criterion, a radio connection is established with that cell. The criterion could be, for example, a signal strength or signal to noise ratio threshold, or some combination of the two. Records are then updated that the cell has joined the active set. Another cell having less good signal quality may be removed from the active set in consequence.

The radio connection to each cell in the active set consists of control channels and a data channels both to the network ("uplink") and to the mobile user terminal ("downlink"). The control channels carry power control commands to adjust the power of transmissions so as to seek to compensate for radio fading. The data channel carry payload data such as encoded speech. When there is no payload data to send, power is reduced.

There is a time delay involved in the mobile user terminal setting up a radio connection with a cell. In other words there is a time delay involved in transferring a cell from the monitored/detected set into the active set. The delay is mainly due to the time required to establish radio synchronisation of the control channels between the mobile user terminal and the network via the new cell. The delay is often long, which is problematic because during the delay the mobile user terminal does not benefit from the desired radio connection with that cell. Also, the longer the delay is, the more likely it is that the signal quality of the desired new radio connection will deteriorate due to radio fading to such an extent that the desired new radio connection turns out to be unacceptable by the time it is established. Accordingly, the new radio connection can be dropped immediately upon being established. Furthermore, long delays make the network as a whole more sluggish in reacting to changing radio conditions. In consequence, it becomes more likely that the overall quality of the call made using the multiple radio connections can become unacceptable.

Accordingly, we can say that such systems are known to have problems in how to minimise the delay in transferring a cell from the monitored/detected set to the active set.

SUMMARY OF THE INVENTION

The inventor(s) found a way to reduce this delay by providing that cells can be in a set in which a control channel has been established but not a corresponding data channel.

An example of the present invention is a method of selecting base station antennas for connection with a mobile user terminal in a radio telecommunications network, comprising the following steps. Test transmissions between the mobile user terminal and base station antennas are made, and the received test transmissions processed to determine respective signal path quality for each of the base station antennas. Upon the determined signal path quality exceeding a first predetermined threshold, but being less than a second predetermined threshold higher than the first predetermined threshold, the mobile user terminal is connected to the corresponding base station antenna by control channels but not data channels so as to be time synchronised. Upon the determined signal path quality exceeding the second predetermined threshold, the mobile user terminal is connected to the corresponding base station antenna by both control channels and data channels so as to be call connected.

BRIEF DESCRIPTION OF THE DRAWINGS

An example embodiment of the present invention will now be described by way of example and with reference to the drawings, in which.

DETAILED DESCRIPTION

From considering a known system, the inventors realised that an intermediate set of cells can be maintained between the monitored/detected set and active set. This new set, known as the synchronised set, contains cells having radio connections in the form of control channels established, but not data channels. As cells in this set are already time synchronised between base station and mobile user terminal, the delay, between the time a cell is selected as suitable for handover to transferring that cell into the active set, is greatly reduced.

The Network

Figure 1:
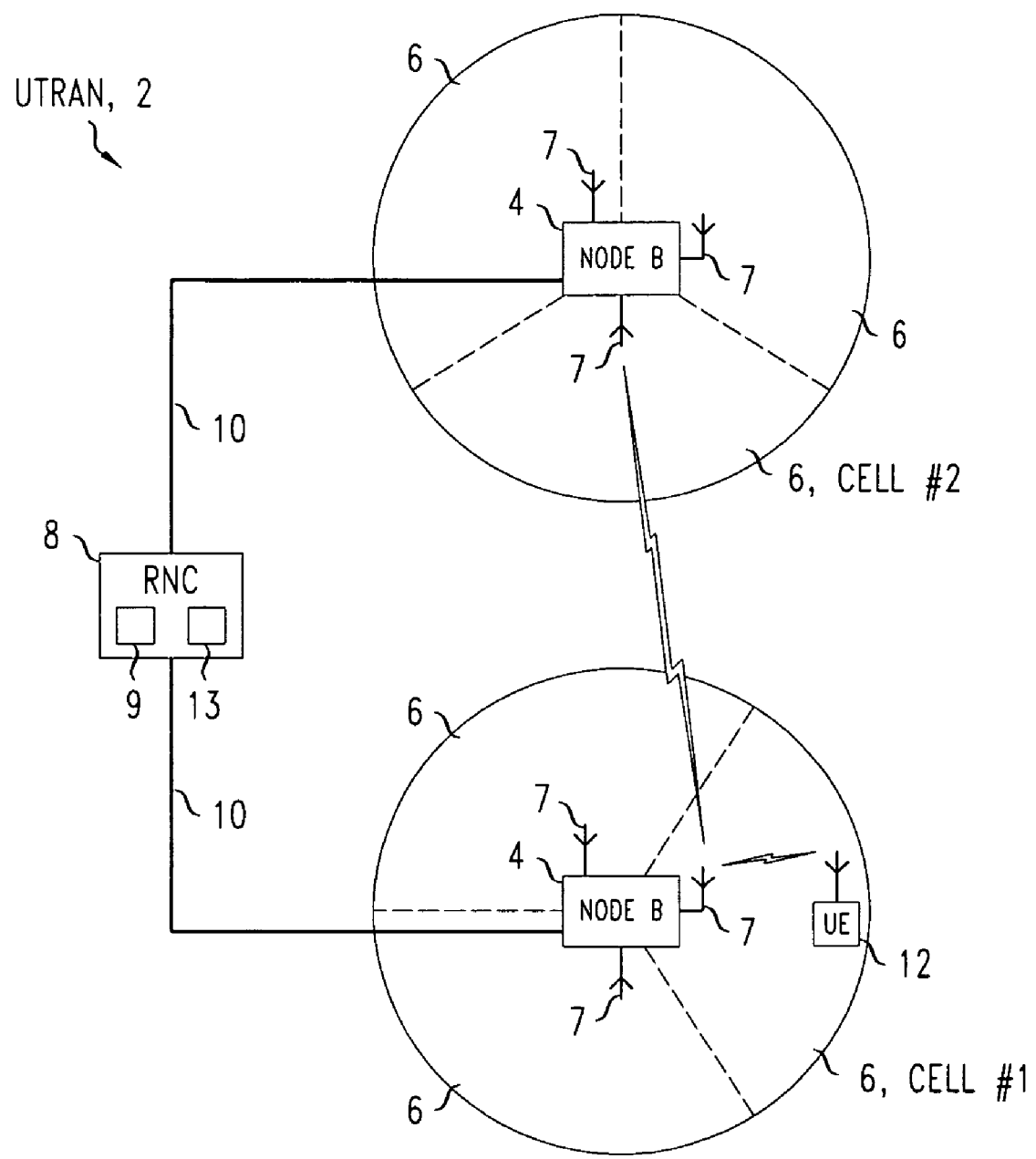
FIG. 1 is a diagram illustrating a Universal Mobile Telecommunications System (UMTS) network.

The network is a Universal Mobile Telecommunications System (UMTS) terrestrial access network (UTRAN), which is a type of wideband code division multiple access (CDMA) network for mobile telecommunications. The UTRAN network is basically as shown in FIG. 1. Only one radio network controller and two base stations of the UTRAN network 2 are shown for simplicity. As shown in this Figure, the UTRAN network 2 includes base stations 4. In the Figure, each of the base stations 4 is also designated "Node B" in accordance with UMTS terminology. A cell, also referred to as a sector, is the radio-coverage area served by a corresponding antenna of a base station. Each base station typically has three cells 6, each covered by one of three directional antennas 7 angled at 120 degrees to each other in azimuth. Each radio network controller (RNC) 8 typically controls several base stations 4 and hence a number of cells 6. A base station 4 is connected to its controlling radio network controller (RNC) 8 via a respective interface 10 known as an IuB interface. In use, a mobile user terminal 12 (often referred to as User Equipment (UE) in UMTS terminology) communicates with a serving radio network controller (RNC) 8 via at least one cell 6 of at least one base station 4. In that way, the mobile user terminal communicates with the UTRAN network 2.

Sets of Cells

Figure 2:
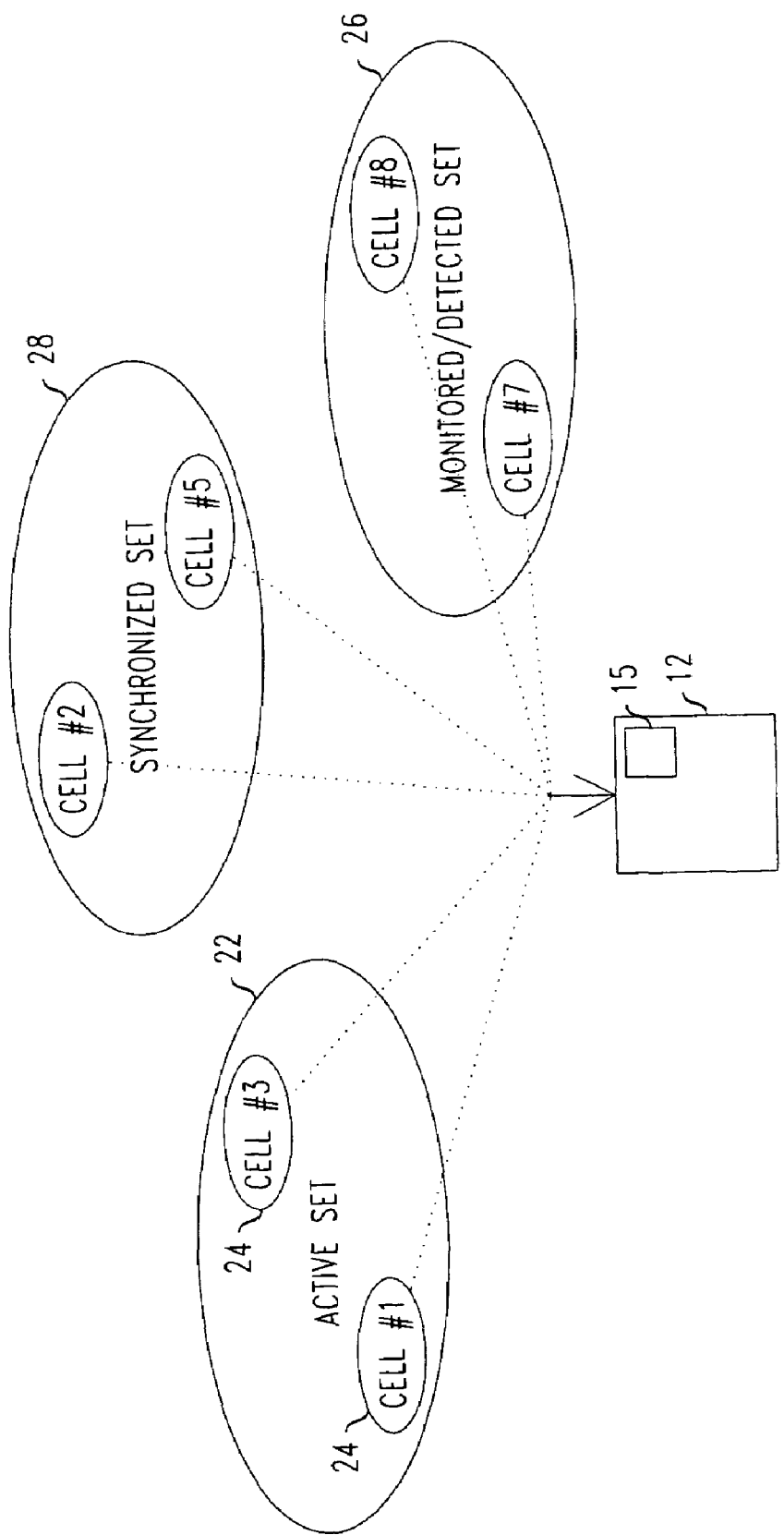
FIG. 2 is a diagram illustrating how for a mobile user terminal cells are categorised into various sets.

As shown in FIG. 2, and mentioned previously, for a mobile user terminal 12 the cells currently connected to by radio are known as the active set 22. Each radio connection to each cell 24 in the active set 22 consists of control channels and a data channels both to the network ("uplink") and to the mobile user terminal 12 ("downlink"). The mobile user terminal 12 is also instructed by the network to monitor signal quality to/from some neighbouring cells not in the active set. This is to determine whether radio connection to any of these neighbouring cells would be helpful in maintaining the quality of the call. A measure of signal quality is signal strength. The set of neighbouring cells currently being investigated in this way is known as the monitored set. Furthermore, the mobile user terminal sometimes detects signals from other cells which are neither in the active set nor monitored set. These other cells are known as the detected set. The set of cells including the cells of the monitored set, and cells of the detected set if any, is known as the monitored/detected set 26.

Lists of which cells are currently in each of the different sets for each mobile user terminal are stored in a memory 9 in the radio network controller 8 (as shown in FIG. 1). This is for reference purposes so that the appropriate cells are for example used to transmit data to a mobile user terminal. For each mobile terminal, there is a list for the synchronised set described below.

Synchronised Set

A so-called synchronised set 28 of cells is provided for each mobile user terminal. A synchronised set 28 contains cells having radio connections in the form of control channels but not data channels. This means that radio synchronisation between a cell and a mobile user terminal is established provided signal quality is sufficiently good but not so good that data channels are to be established in that radio connection. Establishing the control channels is sufficient to bring the cell and mobile user terminal into radio synchronisation. The control channels require little power and bandwidth.

Cells in the synchronised set are either transferred from the monitored/detected set as signal quality improves and synchronisation is undertaken, or transferred from the active set as signal quality deteriorates but with control channels and hence synchronisation maintained in the hope that signal quality will soon improve.

Each of these cells of the synchronised set is thus ready for rapid transfer to the active set when signal quality between itself and the mobile user terminal improves further so that data is to be transmitted over the radio connection. In other words, the significant time delay due to radio synchronisation is eliminated at the stage of transfer of a cell into the active set, namely call handover.

Figure 3:
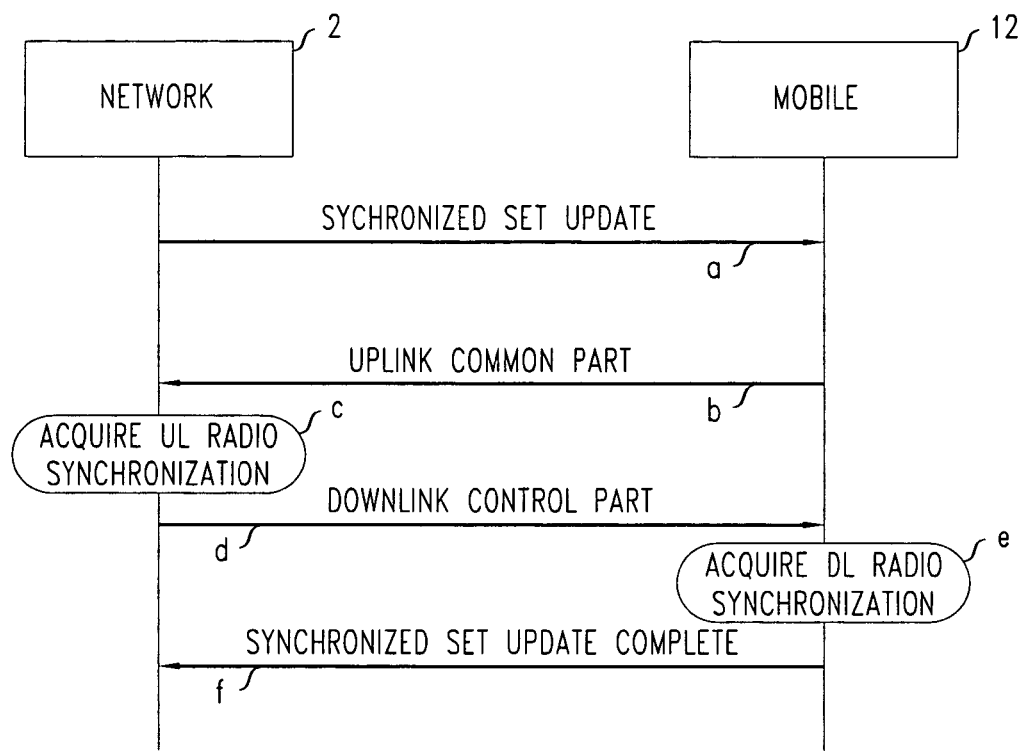
FIG. 3 is a diagram illustrating how a cell enters the synchronised set for a mobile user terminal by establishing control channels of a radio connection with that cell, bring the mobile user terminal and cell into radio synchronisation.

As shown in FIG. 3, radio synchronisation is achieved by the network 2 informing (step a) the mobile user terminal 12 of a signal quality criterion by which any cell in the detected/monitored set 26 is to be transferred to the synchronised set 28. When the criterion is met for signals between the mobile user terminal 12 and any such cell, the mobile establishes (step b) an uplink control channel with that cell. The cell then adapts (step c) its receiver to comes into uplink radio synchronisation with the mobile user terminal. Thereafter the downlink control channel is established (step d). The mobile user terminal 12 then adapts (step e) its receiver to come into downlink radio synchronisation with the cell. That cell is now synchronised with the mobile user terminal. A message is sent (step f) from the mobile user terminal 12 via the cell to the radio network controller 8 of the network informing that the cell is now in the synchronised set 28 for that mobile user terminal 12.

The list at the radio network controller (RNC) of which cells are in the synchronised set for a mobile user terminal is thus kept up to date. This list is referred to by the RNC to instruct a mobile user terminal to start transmitting data over data channels with a cell transferred to the active set.

Selection of Cells for the Synchronised Set

Certain types of events cause a cell to be added to the synchronised set. Other types of events cause a cell to be deleted from the synchronised set. Transfer into and out of the synchronised set depends on the measured strength of a pilot signal. The pilot packet is sent from a test signal generator stage 13 of the base station of the cell to the mobile user terminal 12 which includes a processor 15 which performs the signal strength measurement. The mobile user terminal reports the measurement result to the base station in a measurement report.

Figure 4:
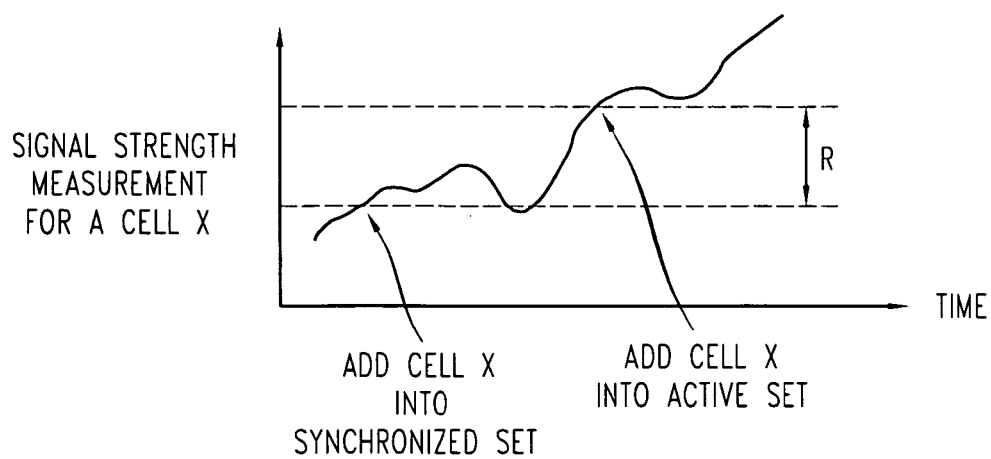
FIG. 4 is a diagram illustrating the criteria how shifting a cell into and out of the synchronised set.

If the pilot signal strength increases to go above the upper limit for pilot signal strength for cells in the detected/monitored set, then the cell is transferred into the synchronised set, under the control of the radio network controller 8 which includes a cell selector stage 11 (as shown in FIG. 1). Similarly, if the pilot signal strength decreases to go below the lower limit for pilot signal strength for cells in the active set, then the cell is transferred into the synchronised set. As shown in FIG. 4, there is accordingly a range, denoted R in FIG. 4, of pilot signal strength values for which a cell is put into the synchronised set.

It follows that, as indicated by point j in FIG. 4, upon pilot signal strength entering the range R from below the cell is transferred into the synchronised set. Also, as indicated by point k in FIG. 4, the cell is transferred to the active set upon pilot signal strength exceeding the range R.

A cell is transferred into the synchronised set from the detected/monitored set by the network setting up control channels. A cell is transferred to the detected/monitored set by the network releasing the control channels.

A cell is transferred into the active set from the synchronised set by the network setting up data channels; the control channels having already been set up. A cell is transferred from the active set to the synchronised set by the network releasing the data channels but not the control channels.

Alternative Implementations

In the example embodiment, for radio connections to cells in the synchronised set control channel data is transmitted in each time slot.

In an alternative embodiment, for cells in the synchronised set, control channel message data is not transmitted every time slot but rather at some longer time interval still sufficient to maintain synchronisation of the radio connection between network mobile user terminal. Use of this longer time interval has the advantage of using the energy stored in the mobile user terminal more slowly. This is often known as power saving.

As control channels have already been established for cells in the synchronised set, data channels can readily be established. In other words transfer to the active set is relatively straight-forward. In the example embodiment, control information is sent from the mobile to the base station over a control channel, the control information indicating when to start sending data downlink, and with what transmission power and frequency bandwidth.

In an alternative embodiment, the radio resources for the downlink data channel is periodically predicted and reserved by control messages sent over the control channels between the mobile user terminal and base station which request and grant those resource allocations. The radio resources are defined by the transmission power and frequency bandwidth to be used. When there is data to send and signal quality is sufficient to establish data channels, the base station simply sends an indication that data will be sent then sends the data. The indication can be a particular bit in a downlink control channel message. Alternatively the indication can be given by simply changing the rate of control channel messages from less than every time slot to every timeslot.

In the example embodiment, the mobile user terminal measures signal strength of a pilot signal (downlink pilot) from a cell in the synchronised set to determine whether to add or remove that cell from the synchronised set.

In an alternative embodiment, the base station measures signal strength of a pilot signal (uplink pilot) from the mobile user terminal to determine whether to add or remove that cell from the synchronised set. Alternatively, the base station measures signal strength of transmissions on the uplink control channel of a radio connection with a cell in the synchronised set or active set to determine whether to add that cell into, or remove that cell from, the synchronised set. Alternatively, the mobile user terminal measures the signal strength of transmissions on the downlink control channel of a radio connection with a cell in the synchronised set or active set to determine whether to add that cell into, or remove that cell from, the synchronised set.

The invention claimed is:

1. A method of selecting base station antennas for connection with a mobile user terminal in a radio telecommunications network, comprising the steps of:
   making test transmissions between the mobile user terminal and base station antennas, and processing the received test transmissions to determine respective signal path quality for each of the base station antennas;
   wherein upon the determined signal path quality exceeding a first predetermined threshold but being less than a second predetermined threshold higher than the first predetermined threshold the mobile user terminal is connected to the corresponding base station antenna by control channels but not data channels so as to be time synchronised; and wherein
   upon the determined signal path quality exceeding the second predetermined threshold the mobile user terminal is connected to the corresponding base station antenna by both control channels and data channels so as to be call connected.

2. A method according to claim 1, in which upon the determined signal path quality being less than the first threshold, the mobile user terminal is connected to the corresponding base station antenna by neither control channels nor data channels.

3. A method according to claim 1, in which the control channels comprise at least one control channel in each direction between the mobile user terminal and said corresponding base station antenna.

4. A method according to claim 1, in which the network comprises a base station controller, and there are multiple mobile user terminals,
   in which for each mobile user terminal identifiers of the base station antennas having a signal path quality between the thresholds are recorded for reference in a first list in the base station controller, and
   in which for each mobile user terminal identifiers of the base station antennas having a signal path quality exceeding the second threshold are recorded for reference in a second list in the base station controller.

5. A method according to claim 1, in which, when the mobile user terminal is connected to the corresponding base station antenna by control channels but not data channels, control channel data is transmitted over control channels at a rate of less than every timeslot but sufficient to maintain synchronisation between said base station antenna and mobile user terminal.

6. A method according to claim 5, in which the base station antenna indicates to the mobile user terminal that data channels are to be established by changing to sending control channel data every timeslot.

7. A radio telecommunications network comprising base stations, each base station having at least one antenna, the network comprising a selector of base station antennas to be used for connection with a mobile user terminal, the network comprising
   a generator of test transmissions between the mobile user terminal and base station antennas, and a processor configured to process the received test transmissions to determine respective signal path quality for each of the base station antennas;
   wherein the selector is configured to control connections such that upon the determined signal path quality exceeding a first predetermined threshold but being less than a second predetermined threshold higher than the first predetermined threshold the mobile user terminal is connected to the corresponding base station antenna by control channels but not data channels so as to be time synchronised, and wherein upon the determined signal path quality exceeding the second predetermined threshold the mobile user terminal is connected to the corresponding base station antenna by both control channels and data channels so as to be call connected.

8. A network according to claim 7, in which the selector is configured to control connections such that upon the determined signal path quality being less than the first threshold, the mobile user terminal is connected to the corresponding base station antenna by neither control channels nor data channels.

9. A network according to claim 7, in which the network comprises a base station controller, and there are multiple mobile user terminals,
   in which for each mobile user terminal identifiers of the base station antennas having a signal path quality between the thresholds are recorded for reference in a first list in the base station controller, and
   in which for each mobile user terminal identifiers of the base station antennas having a signal path quality exceeding the second threshold are recorded for reference in a second list in the base station controller.

10. A network according to claim 7, in which, when the mobile user terminal is connected to the corresponding base station antenna by control channels but not data channels, control channel data is transmitted over control channels at a rate of less than every timeslot but sufficient to maintain synchronisation between said base station antenna and mobile user terminal.

* * * * *